(12) United States Patent
Stamps et al.

(10) Patent No.: US 8,764,396 B2
(45) Date of Patent: Jul. 1, 2014

(54) LEAD-LAG DAMPER FOR ROTOR HUBS

(75) Inventors: Frank B. Stamps, Colleyville, TX (US); James L. Braswell, Colleyville, TX (US); David A. Haynie, Euless, TX (US); Mithat Yuce, Lantana, TX (US)

(73) Assignee: Textron Innovations Inc., Providence, RI (US)

( * ) Notice: Subject to any disclaimer, the term of this patent is extended or adjusted under 35 U.S.C. 154(b) by 881 days.

(21) Appl. No.: 12/866,920

(22) PCT Filed: Feb. 12, 2008

(86) PCT No.: PCT/UW2008/053742
§ 371 (c)(1),
(2), (4) Date: Aug. 10, 2010

(87) PCT Pub. No.: WO2009/102324
PCT Pub. Date: Aug. 20, 2009

(65) Prior Publication Data
US 2011/0027083 A1  Feb. 3, 2011

(51) Int. Cl.
*B64C 27/51* (2006.01)
(52) U.S. Cl.
USPC .......................................................... 416/107
(58) Field of Classification Search
USPC .......................................... 416/107, 106, 141
See application file for complete search history.

(56) References Cited

U.S. PATENT DOCUMENTS

| | | | |
|---|---|---|---|
| 2,744,553 A | 5/1956 | Folk | |
| 2,774,553 A | 12/1956 | Jensen | |
| 3,638,885 A | 2/1972 | Reed | |
| 3,759,632 A | 9/1973 | Rybicki | |
| 4,178,130 A | 12/1979 | Ferris et al. | |
| 5,540,549 A * | 7/1996 | McGuire | 416/140 |
| 8,181,755 B2 | 5/2012 | Stamps et al. | |
| 2004/0145102 A1* | 7/2004 | Russell et al. | 267/140.11 |

FOREIGN PATENT DOCUMENTS

WO    WO 2005021990 A2 *   3/2005

OTHER PUBLICATIONS

Canadian Examination Report dated Dec. 3, 2012 from counterpart CA App. No. 2,714,527.
Chinese Examination Report dated Nov. 12, 2012 from counterpart CN App. No. 200880126322.3.

(Continued)

*Primary Examiner* — Nathaniel Wiehe
*Assistant Examiner* — Kayla McCaffrey
(74) *Attorney, Agent, or Firm* — James E. Walton; Richard G. Eldredge

(57) ABSTRACT

A lead-lag damper for a rotor assembly has a body mounted to either an inboard portion of a blade assembly or a fixed portion of the rotor assembly. A piston carried within the body is configured to allow for relative motion between the body and the piston. The piston defines opposing chambers within the body, the chambers being in fluid communication through a fluid passage. A link connects the piston to the other of the inboard portion of the blade assembly and the fixed portion of the rotor assembly, and the link engages a central portion of the piston. The piston acts on fluid in the chambers during relative motion between the piston and the body and causes fluid flow between the chambers through the fluid passage. Flow through the passage acts to damp lead-lag motion of the blade assembly relative to the fixed portion of the rotor assembly.

18 Claims, 9 Drawing Sheets

(56) References Cited

OTHER PUBLICATIONS

Second Chinese Office Action dated Jun. 24, 2013 from counterpart CN Appl. No. 200880126322.3.
European Examination Report dated May 15, 2013 from counterpart EP App. No. 08780416.7.
Canadian Office Action dated Oct. 9, 2013 from counterpart CA Appl. No. 2714527.
European Office Action dated Oct. 21, 2013 from counterpart EP Appl. No. 08780416.7.
Chinese Office Action dated Jan. 8, 2014 from counterpart CN App. No. 200880126322.3.

* cited by examiner

LEAD-LAG DAMPER FOR ROTOR HUBS

TECHNICAL FIELD

The technical field is lead-lag dampers for rotor hubs.

DESCRIPTION OF PRIOR ART

Operation of a multiple-blade rotor of an aircraft may lead to dynamic modes in which the blades encounter oscillating chordwise, in-plane forces. For example, the oscillating forces may be the result of unequal drag forces on advancing and retreating blades during forward flight of a helicopter. To relieve stress on rotor components, the rotor may be designed to allow a small amount of lead-lag motion of the blades relative to each other and to the central hub. The lead-lag motion may be provided for using various means, including use of discrete lead-lag hinges or use of virtual hinges in a flexible yoke.

To control the lead-lag motion of the blades, lead-lag dampers may be used to provide for damping of in-plane motion of individual blades. Existing dampers may be formed from elastomeric materials and/or hydraulic components. However, current damper designs do not provide for the desired damping characteristics or required exterior dimensions for all applications.

DESCRIPTION OF THE PREFERRED EMBODIMENT

An improved lead-lag damper is provided for use in a rotor hub to damp in-plane motions of an attached rotor blade.

Figure 1:
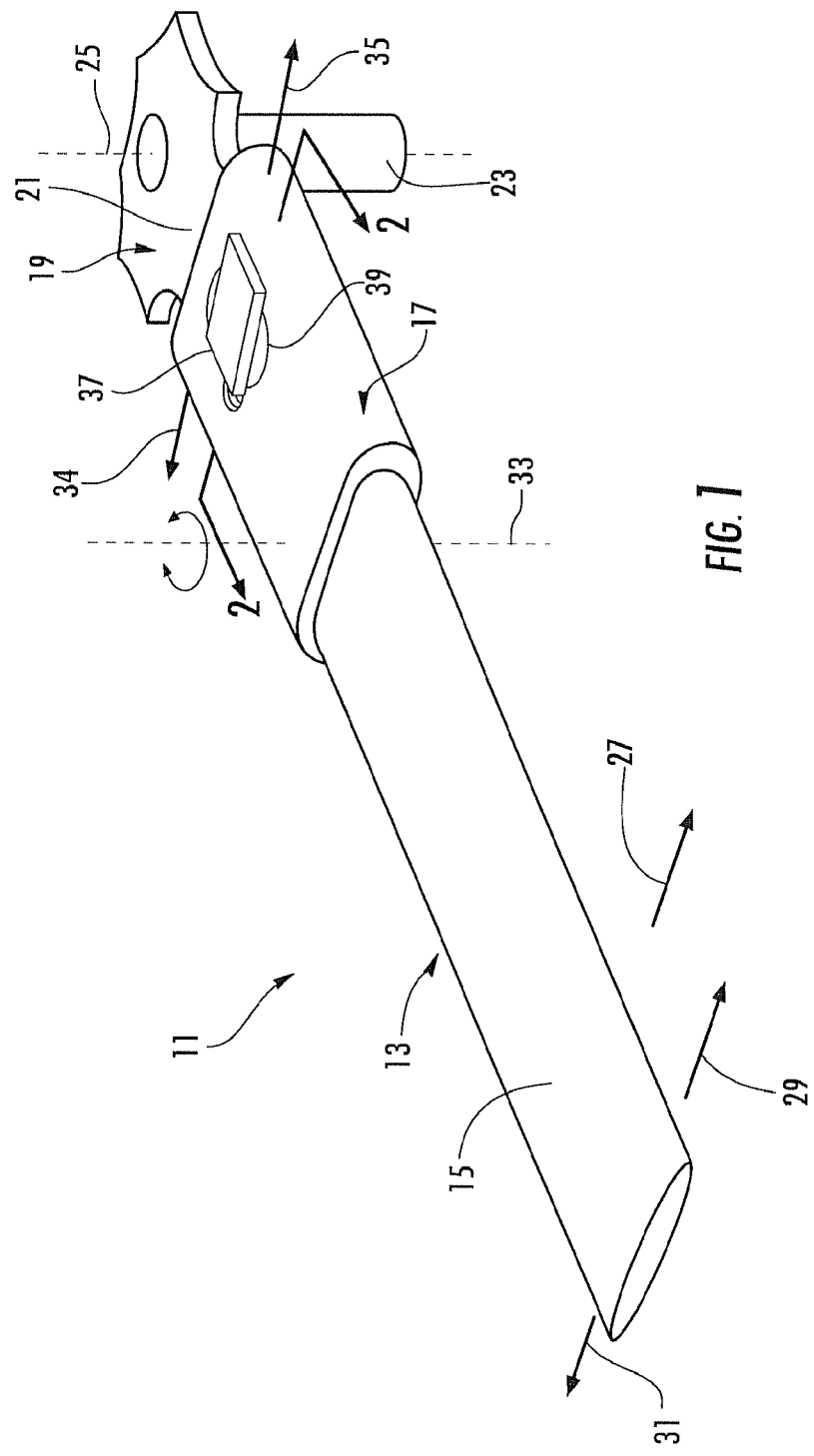
FIG. 1 is an oblique view of a portion of a rotor assembly having a lead-lag damper installed therein.

FIG. 1 shows a rotor assembly 11, which comprises multiple rotor blade assemblies 13, though only one assembly 13 is shown in the view. Each blade assembly 13 comprises a blade 15 and a blade grip 17, which connects blade 15 to a central yoke 19, and each blade assembly 13 is able to rotate about a pitch axis relative to yoke 19. Yoke 19 has a plurality of arms 21 extending radially, and each blade assembly 13 is attached to one of arms 21. Yoke 19 is attached to mast 23 for rotation with mast 23 about mast axis 25. The following description will describe components in relation to one portion of rotor assembly 11, though it should be understood that the description applies equally to other portions of assembly 11.

In the configuration shown in FIG. 1, arm 21 of yoke 19 is designed to allow for lead-lag motion of blade 15 during operation of rotor assembly 11. Rotor assembly 11 is configured for rotation about mast axis 25 in the direction shown by arrow 27, and the lead-lag motion is in-plane motion of the outer tip of blade 15, as indicated by arrows 29 (lead motion) and 31 (lag motion). Assembly 11 is a referred to as a "bearingless flexbeam rotor hub," in which the lead-lag motion is centered about a virtual hinge axis 33. Virtual hinge axis 33 lies in an outboard region of arm 21 and is created by tailoring the construction of arm 21, such as with narrowed cross-section thickness or through use of materials with specified properties. Because hinge axis 33 is outboard of a portion of blade grip 17, the inboard portion of grip 17 experiences in-plane motion in the opposite direction to the motion of the outer end of blade 15. When blade 15 rotates in the direction shown by arrow 29 (lead), the inboard portion of grip 17 rotates about hinge axis 33 in the direction indicated by arrow 34, whereas when blade 15 rotates in the direction shown by arrow 31 (lag), the inboard portion of grip 17 rotates in the direction indicated by arrow 35.

To provide for damping of lead-lag motion of blade 15, at least one fluid-shear damper 37 is installed in an aperture 39 in grip 17 for providing a damping force opposing motion of the inboard portion of grip 17 relative to a fixed portion of rotor assembly 11. One advantage of the embodiment shown for damper 37 is the ability to be used in apertures 39 formed to receive prior-art lead-lag dampers (not shown), allowing damper 37 to be used in new rotor assemblies and to be retrofitted to certain existing rotor assemblies.

Figure 2:
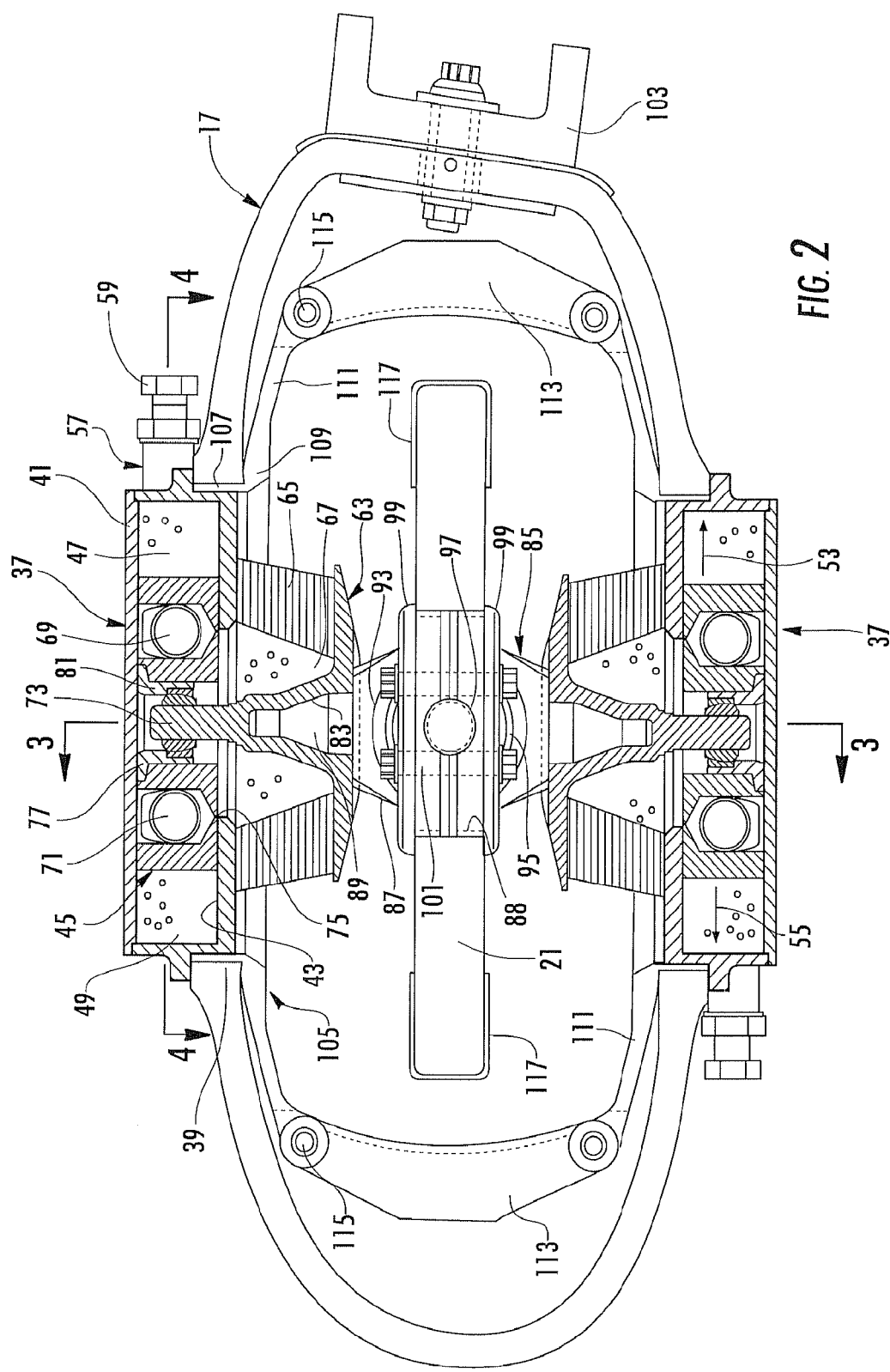
FIG. 2 is a cross-sectional view of a portion of the rotor assembly of FIG. 1 taken along the line 2-2 shown in FIG. 1.
Figure 3:
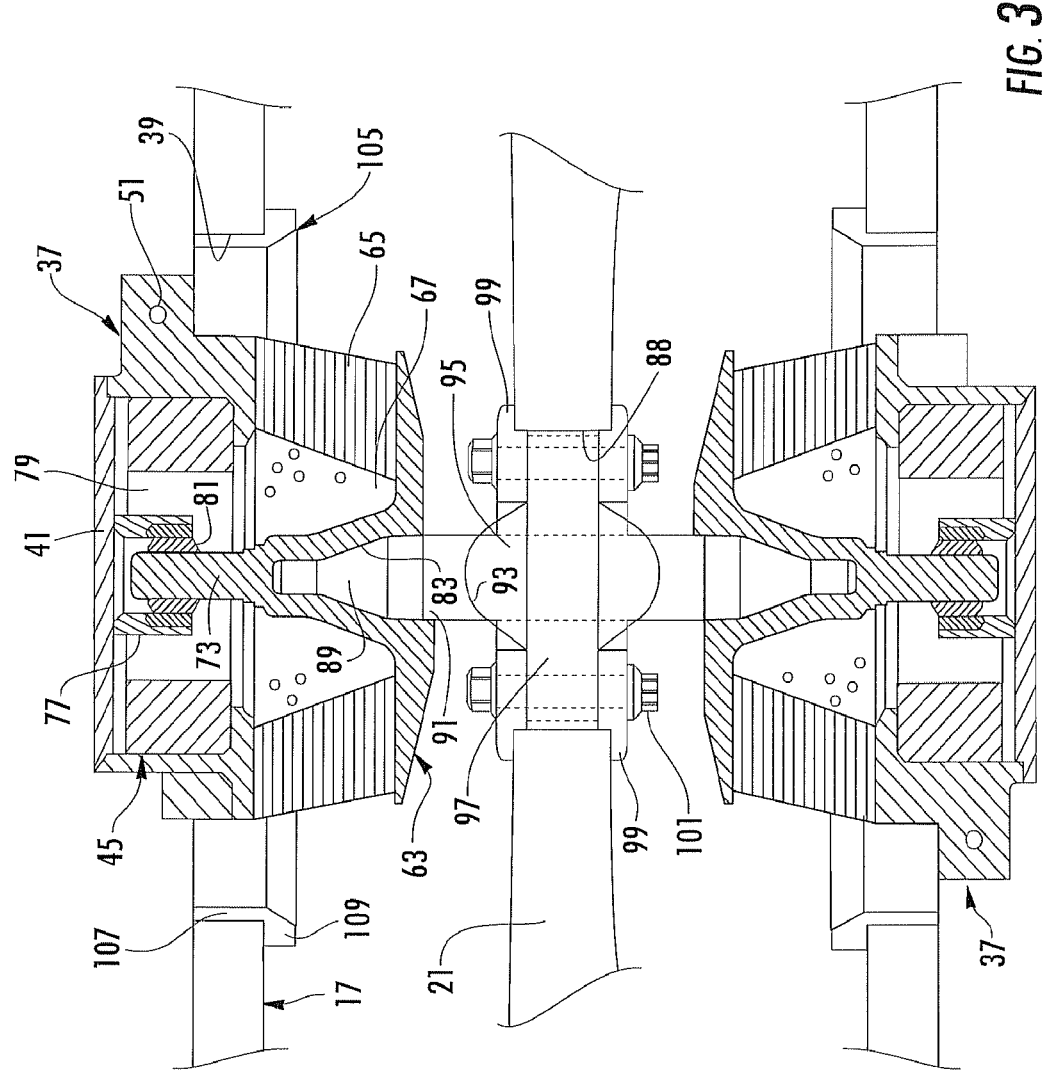
FIG. 3 is a cross-sectional view of a portion of the rotor assembly of FIG. 1 taken along the line 3-3 shown in FIG. 2.
Figure 4:
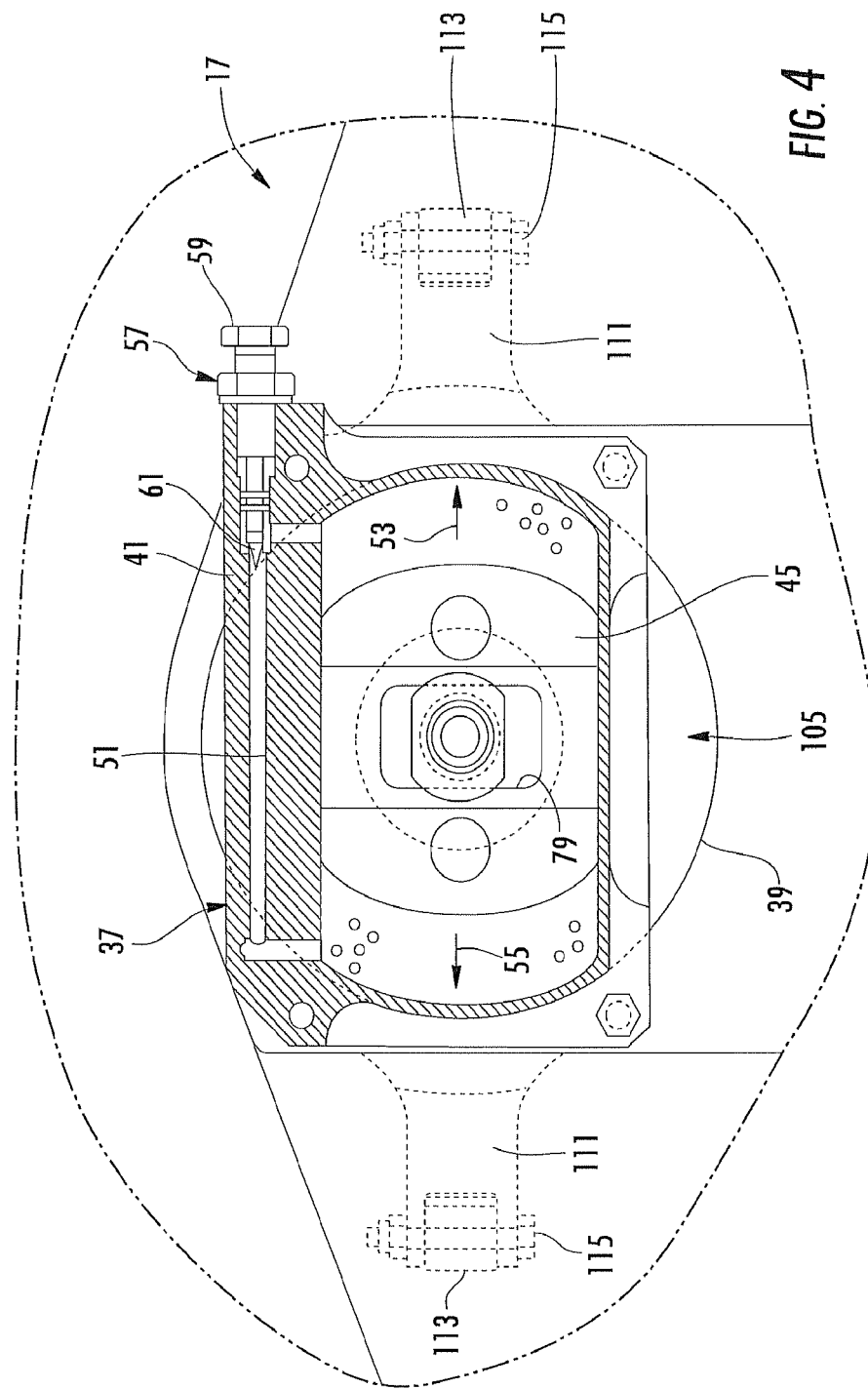
FIG. 4 is a cross-sectional view of a portion of the rotor assembly of FIG. 1 taken along the line 4-4 shown in FIG. 2.

Referring now to FIGS. 2 through 4, FIG. 2 is a cross-sectional view taken at the line 2-2 of FIG. 1, FIG. 3 is a cross-sectional view taken at the line 3-3 of FIG. 2, and FIG. 4 is a cross-sectional view taken at the line 4-4 of FIG. 2. The view of FIG. 2 is in the outboard direction, with lead-lag hinge axis 33 (FIG. 1) being located outboard of the cross-section plane. The view of FIG. 3 is in the direction of rotation of rotor assembly 11, as indicated by arrow 27 (FIG. 1). FIG. 4 is a cross-section of damper 37 as viewed from above the cross-section plane.

A damper 37 is mounted on an upper side and a lower side of each grip 17, and dampers 37 have similar or identical configurations. Damper 37 comprises a generally rectangular main housing 41, which forms a piston cylinder 43 within housing 41. A piston 45 is slidably carried within cylinder 43, and there are preferably no seals between piston 45 and the inner surfaces of cylinder 43. Damper 37 is a fluid-shear damper with a soft static spring rate in the damped direction and is configured to maximize the size of piston 45 in the space allowed, providing a large piston 45 which pumps a relatively large amount of fluid within housing 41. Piston 45 divides cylinder 43 into two volumes 47, 49, and volumes 47, 49 are in fluid communication through passage 51. In a configuration with no seals between cylinder 43 and piston 45, fluid may also flow between cylinder 43 and piston 45. Cylinder 43 is moveable relative to piston 45 in chordwise directions, as indicated by arrows 53, 55, and movement of cylinder 43 relative to piston 45 causes fluid within cylinder volumes 47, 49 to flow between volumes 47, 49 through passage 51. In a configuration with no seals between cylinder 43 and piston 45, fluid may also flow between cylinder 43 and piston 45.

To provide for damping of the relative motion between piston 45 and cylinder 43, a fluid restriction is created within passage 51. In the embodiment shown, an adjustable orifice device 57 is installed in housing 41 and allows for adjustment of the amount of flow restriction by rotation of knob 59.

Rotation of knob 59 changes the location of a conical plunger 61 in relation to a portion of passage 51 for shrinking or enlarging an orifice created therebetween. Alternatively, passage 51 may be configured to have a fixed, non-adjustable orifice for restricting fluid flow between volumes 47, 49. In addition, damper 37 may incorporate a pressure relief device, such as a spring-biased bypass valve, to limit fluid pressure in damper 37 during operation.

Damper 37 also comprises a cap 63 that is connected to housing 41 with a frusto-conical, laminated elastomeric bearing 65, which is sealed to both cap 63 and housing 41. Bearing 65 encloses an annular fluid volume 67 that contains additional fluid and is in fluid communication with volumes 47, 49 through cylinder 43. Two balloon accumulators 69, 71 are located in piston 45 for to facilitate thermal expansion of fluid in damper 37. Alternatively, damper 37 may include a diaphragm or other appropriate volume compensation device instead of accumulators 69, 71 to facilitate the thermal expansion of fluid in damper 37. Bearing 65 of each damper 37 also carries beam loads transferred from blade 15 and through grip 17. It should be noted that bearing 65 may be formed from an elastomer that has a high damping coefficient, providing for additional damping force.

Cap 63 has protrusion 73 that extends into volume 67 and through an aperture 75 in housing 41 for engaging a slider 77 located in a slot 79 in a central portion of piston 45. A bearing 81 allows for rotational and axial movement between protrusion 73 and slider 77. Forces exerted on piston 45 by fluid in volumes 47, 49 are transferred through bearing 81 into protrusion 73. Slider 77 is free to move within slot 79 to allow for radial movement of grip 17 due to centrifugal forces created when rotor assembly 11 is in operation. In the figures, cap 63, protrusion 73, and slider 77 are shown in a position during operation, which is approximately located in the center of available travel in slot 79. When rotor assembly 11 is at rest, cap 63, protrusion 73, and slider 77 will be located in an inboard position. Aperture 75 allows for fluid in fluid volume 67 to be in communication with cylinder 43 and piston 45, but the fluid in volume is unpressurized.

A cavity 83 is formed in the center of each cap 63, and cavities 83 are sized to receive an end portion of link 85. Link 85 comprises a body 87 and two pins 89 extending from opposite sides of body 87. Link 85 extends through an aperture 88 in yoke arm 21 and serves to retain caps 63 and pistons 45 in a generally fixed position in the lead-lag directions relative to yoke arm 21 while slider 77 allows for radial movement. Each pin 89 is inserted within cavity 83 of one of caps 63, and an anti-rotation element 91 of cap 63 engages a corresponding element on pin 89 to prevent relative rotation of cap 63 and the inserted pin 89.

Body 87 of link 85 has a central cavity 93 sized to receive an elastomeric bearing 95 carried on a cylindrical pinion 97, which is carried within aperture 88. Pinion 97 is located within aperture 88 with aperture inserts 99, and inserts 99 are fastened together with fasteners 101. Inserts 99 cooperate to clamp onto yoke arm 21 and retain pinion 97 in a central position within aperture 88, allowing for rotation of link 85 relative to yoke arm 21 about pinion 97 and bearing 95. This rotation allows for pitch changes of grip 17 and attached blade 15 when flight control systems act on pitch horn 103, which is attached to a trailing portion of grip 17.

Each damper 37 is located within aperture 39 of grip 17 using a mounting adapter 105, and each adapter 105 comprises a ring portion 107 and a lip portion 109. Ring portion 107 fills the space between the outer edges of housing 41 and the surface of aperture 39, and lip portion 109 engages the inner surface of grip 17 adjacent aperture 39. Adapters permit mounting of dampers 37 within circular apertures 39 of grips 17, which allows for retrofitting of dampers 37 on existing grips 17, as mentioned above. Arms 111 are formed at leading and trailing portions of each adapter 105, curved hard stops 113 are attached between each pair of leading arms 111 and between each pair of trailing arms 111 using fasteners 115. Stops 113 prevent excessive lead-lag movement of grip 17 relative to yoke arm 21 by bumping against yoke arm 21 and transferring forces from stops 113, into adapters 105, and into grip 17. To limit or prevent wear of yoke arm 21, an elastomeric or rigid bumper 117 is located on each of the leading and trailing edges of yoke arm 21 to prevent stops 113 from directly contacting yoke arm 21. Bumpers 117 may be formed from, for example, Teflon, rubber, or other appropriate materials.

Figure 5:
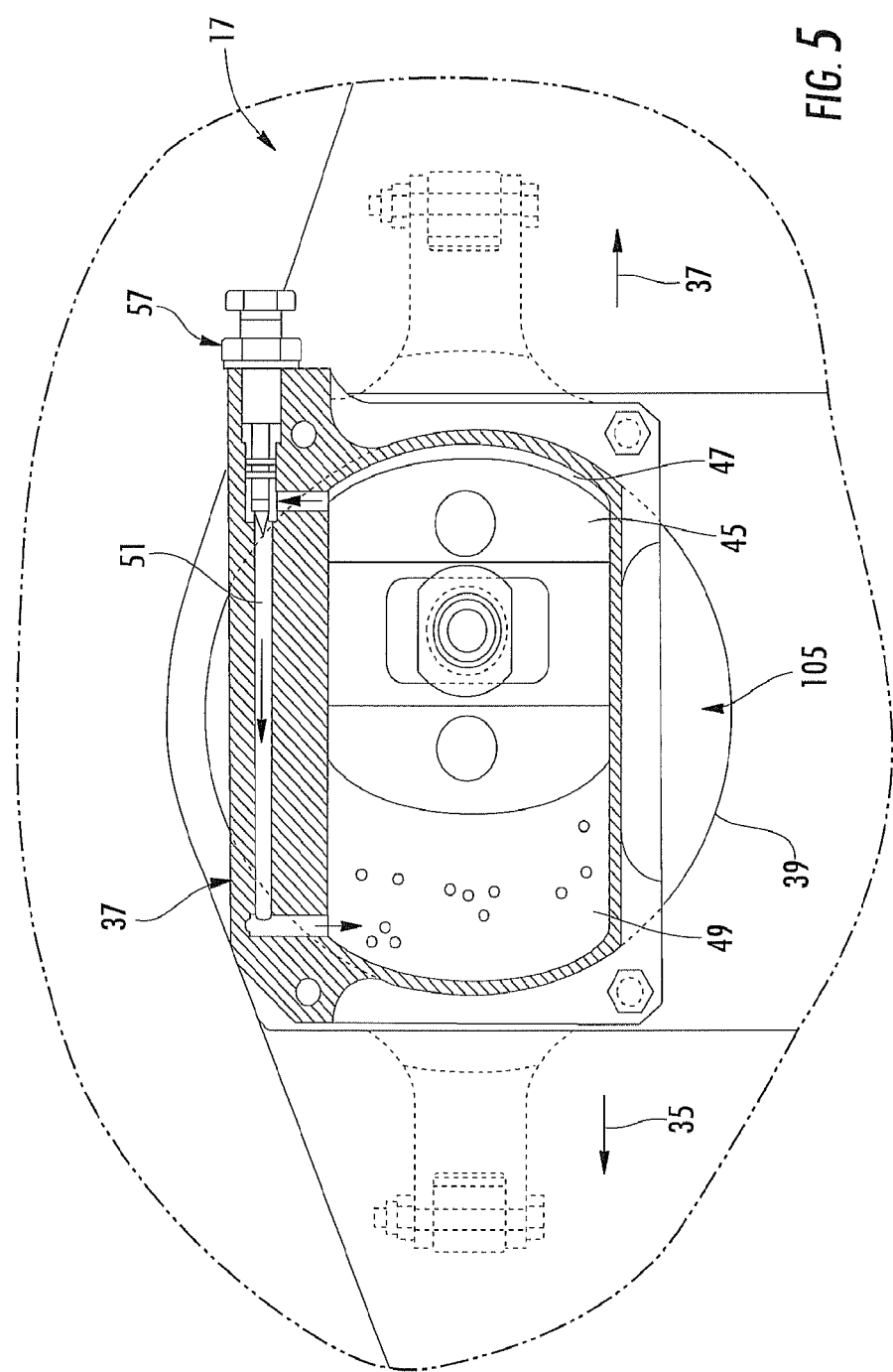
FIG. 5 is a cross-sectional view as in FIG. 4 and shown in operation.

FIG. 5 shows damper 37 during operation, in which grip 17 and housing 41 have been moved relative to piston 45 and in the direction indicated by arrow 35. As noted above, the inboard portion of grip 17 moves in the opposite direction to the outboard end of blade 15, so the movement shown correlates to a "lag" movement of blade 15, as indicated by arrow 31 of FIG. 1. The movement of housing 41 relative to piston 45 forces at least a portion of the fluid within volume 47 to pass through passage 51 and into volume 49. The flow restriction caused by orifice device 57 damps the relative motion between piston 45 and housing 41, thus damping relative motion of grip 17 and yoke arm 21. Damper 37 will also damp "lead" movement of blade 15, in which grip 17 moves in the opposite direction, indicated by arrow 34.

The lead-lag damper described above provides for several advantages, including: (1) providing for a damper mounted outside of the interior of a blade grip, which allows for a larger damper and a smaller aperture in the arms of the yoke; and (2) providing a damper that can be retrofitted to existing blade grips.

FIGS. 6 through 9 illustrate an alternative embodiment of an improved lead-lag damper for use in a rotor hub.

Figure 6:
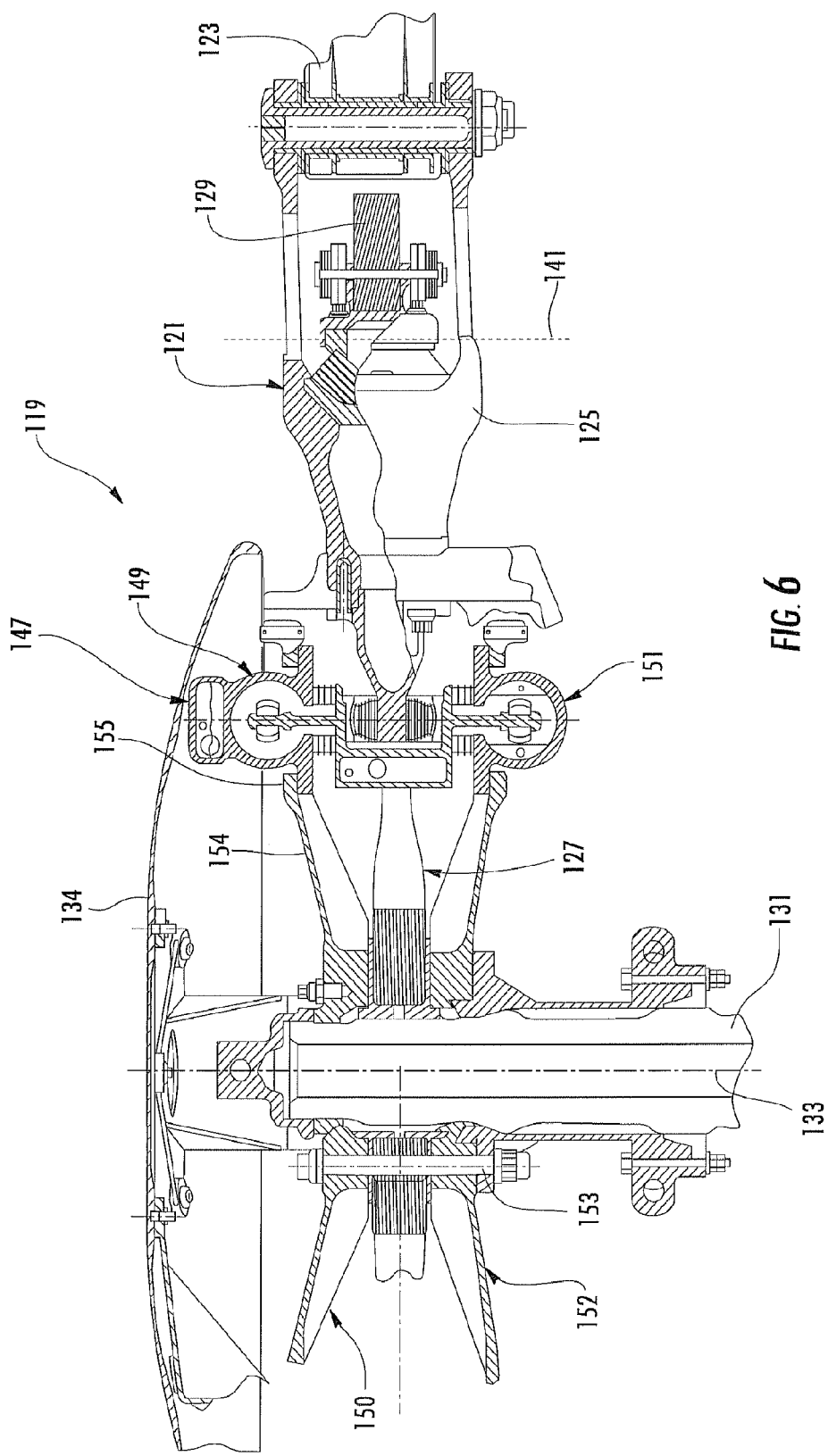
FIG. 6 is a cross-sectional side view of a portion of a rotor assembly having a lead-lag damper installed therein.
Figure 7:
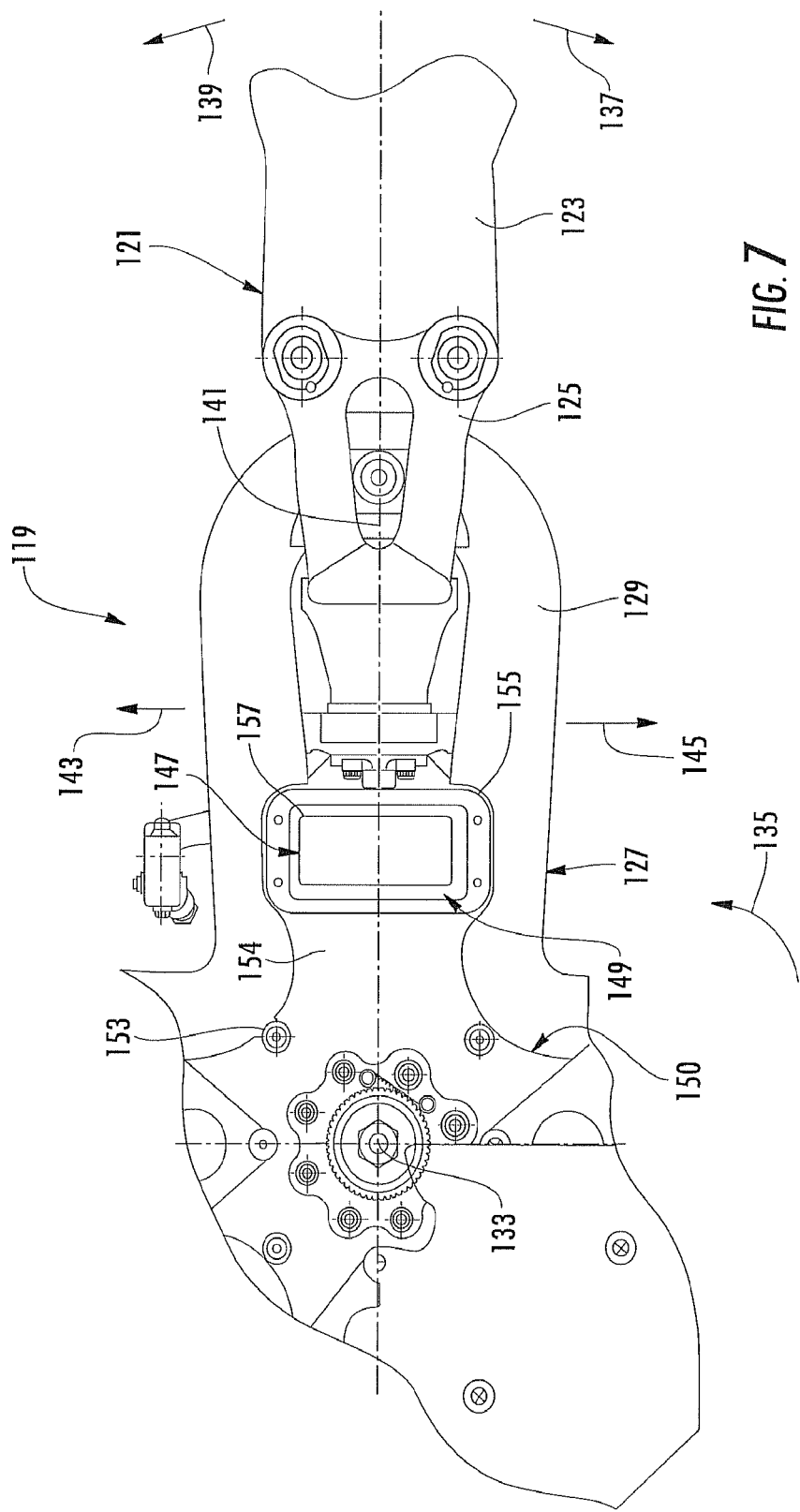
FIG. 7 is a top view of a portion of the rotor assembly of FIG. 1.

FIG. 6 is a side, partially cross-sectioned view of a portion of a rotor assembly 119, and FIG. 7 is a top view of the portion of assembly 119. Rotor assembly 119 comprises multiple rotor blade assemblies 121, though portions of only one assembly 121 are shown in the views. Each blade assembly 121 comprises a blade 123 and a blade grip 125, which connects blade 123 to a central yoke 127, and each blade assembly 121 is able to rotate about a pitch axis relative to yoke 127. Yoke 127 has a plurality of arms 129 extending radially, and each blade assembly 121 is attached to one of arms 129. Yoke 127 is attached to mast 131 for rotation with mast 131 about mast axis 133. In FIG. 6, the portion of the figure to the right of mast axis 133 is partially cross-sectioned along a plane bisecting grip 125, whereas a portion of the figure to the left of mast axis 133 is sectioned along a parallel, offset plane. In FIG. 7, cover 134 is shown installed on the upper portion of rotor assembly 119, but cover 134 is shown removed in FIG. 7 for ease of viewing components located beneath cover 134.

The following description will describe components in relation to one portion of rotor assembly 119, though it should be understood that the description applies equally to other portions of assembly 119.

In the configuration shown in the figures, rotor assembly 119 is designed to allow for lead-lag motion of blade 123 during operation. Rotor assembly 119 is configured for rotation about mast axis 133 in the direction shown by arrow 135, and the lead-lag motion is in-plane motion of the outer tip of blade 123, as indicated by arrows 137 (lag motion) and 139 (lead motion). A lead-lag axis 141 lies in an outboard region of arm 129, and, because lead-lag axis 141 is outboard of a portion of blade grip 125, the inboard portion of grip 125 experiences in-plane motion in the opposite direction to the motion of the outer end of blade 123. When blade 123 rotates in the direction shown by arrow 137 (lag), the inboard portion of grip 125 rotates about lead-lag axis 141 in the direction indicated by arrow 143, whereas when blade 123 rotates in the direction shown by arrow 139 (lead), the inboard portion of grip 125 rotates in the direction indicated by arrow 145.

To provide for damping of lead-lag motion of blade 123 relative to a fixed portion of rotor assembly 11, a lead-lag damper assembly 147 is installed in rotor assembly 119. Damper assembly 147 has at least one fluid-shear damper 149, and the embodiment shown has an upper damper 149 installed on an upper damper support plate 150 and a lower damper 151 installed on a lower damper support plate 152. In the preferred embodiment of damper assembly 147, two dampers 149, 151 are used for each blade, providing for redundancy in the case of a failure of either damper 149, 151. Support plates 150, 152 are bolted to yoke 127, mast 131, and to each other with bolts 153 (one of which is sectioned by the offset plane in FIG. 6). Each support plate 150, 152 has arms 154 extending radially relative to mast axis 133 and angling away from yoke 127, such that their outer ends are located a distance from yoke 127. Arms 154 each terminate in an integral mounting plate 155, and each plate 155 has a rectangular aperture 157. Each mounting plate 155 and aperture 157 is configured to receive and fixedly support one of damper 149, 151.

Figure 8:
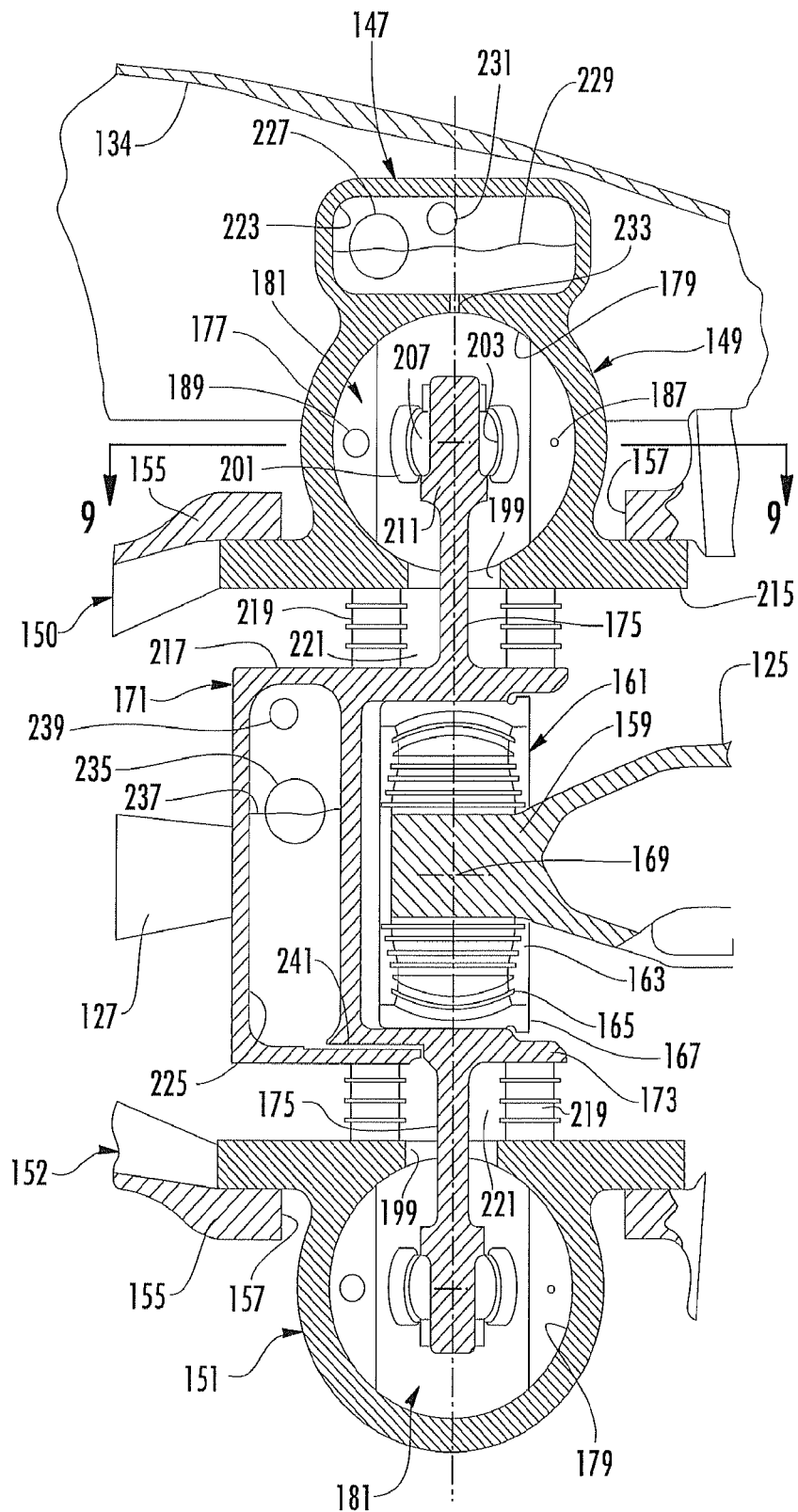
FIG. 8 is an enlarged cross-sectional view of a portion of the rotor assembly of FIG. 1.
Figure 9:
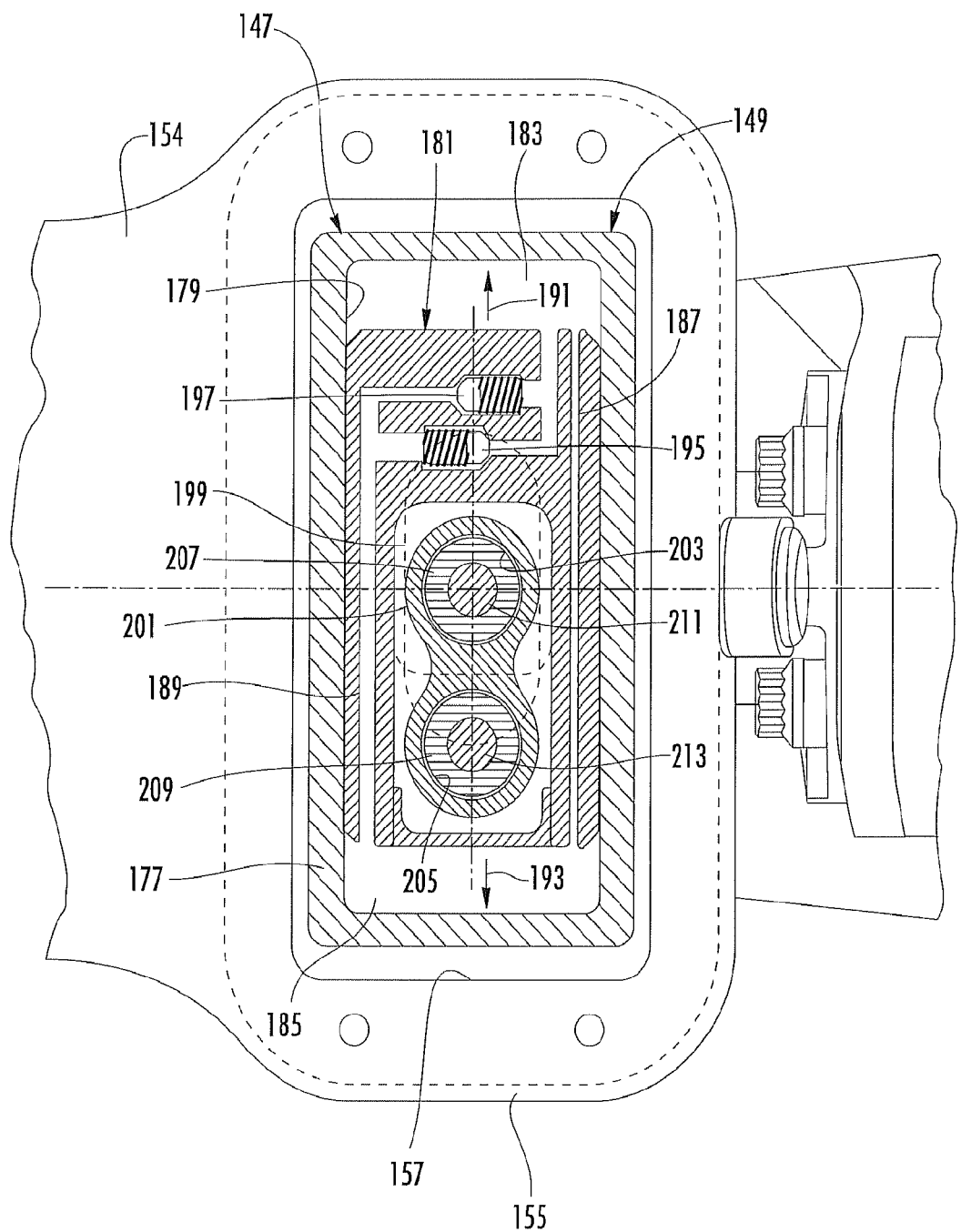
FIG. 9 is a cross-sectional top view of a portion of the rotor assembly of FIG. 1 taken along the line 9-9 shown in FIG. 8.

Referring also to FIGS. 8 and 9, FIG. 8 is an enlarged cross-sectional view of damper assembly 147 taken along the same plane as the cross-section of the right side of FIG. 6, and FIG. 9 is a partial cross-section taken along the section plane 9-9 of FIG. 8.

Dampers 149, 151 provide a damping force opposing motion of the inboard portion of grip 125, which is connected to dampers 149, 151 through shaft 159. Shaft 159 extends inwardly from the inboard end of grip 125 and engages bearing assembly 161, which comprises a radial bearing 163, a spherical bearing 165, and a bearing cup 167. Bearings 163, 165 are preferably laminated elastomeric bearings, and radial bearing 163 is carried within spherical bearing 165. The combination of bearings 163, 165 allows for limited longitudinal motion of shaft 159 relative to bearing cup 167 and for limited rotation about bearing focus 169 of shaft 159 relative to cup 167. Bearing cup 167 is installed within a force transfer member 171, which moves with the inner end of grip 125 as motion and forces are transferred from shaft 159, through bearing assembly 161, and into member 171. Bearing cup is installed within a central body 173 of member 171. In the embodiment having upper damper 149 and lower damper 151, two beams 175 protrude in opposite directions from body 173, each beam 175 extending into one of dampers 149, 151.

Each damper 149, 151 is constructed similarly to the other of dampers 149, 151, and the following description of damper 149 applies equally to damper 151 except where noted.

Damper 149 comprises a generally cylindrical main housing 177, which forms a piston cylinder 179 within housing 177. A piston 181 is slidably carried within cylinder 179, and there are preferably no seals between piston 181 and the inner surfaces of cylinder 179. Damper 149 is a fluid-shear damper with a soft static spring rate in the damped direction and is configured to maximize the size of piston 181 in the space allowed, providing a large piston 181 which pumps a relatively large amount of fluid within housing 177. Piston 181 divides cylinder 179 into two volumes 183, 185, and volumes 183, 185 are in fluid communication through passages 187, 189 in piston 181. Piston 181 is moveable relative to cylinder 179 in chordwise directions, as indicated by arrows 191, 193, and movement of piston 181 relative to cylinder 179 causes fluid within cylinder volumes 183, 185 to flow between volumes 183, 185 through at least passage 187. In a configuration with no seals between cylinder 179 and piston 181, fluid may also flow between cylinder 179 and piston 181.

To provide for damping of the relative motion between piston 181 and cylinder 179, a fluid restriction is created by the relatively small diameter of passage 187. Two pressure relief devices, which are incorporated as directional, spring-biased bypass valves 195, 197, are located in passage 189 to prevent fluid in volumes 183, 185 from flowing through passage 189 at pressures below a selected pressure. However, to prevent overpressure of damper 149 due to rapid movement of piston 181, fluid may also travel through passage 189 by overcoming the resistance of the valve 195, 197 associated with flow in that direction. Though not shown in the figures, an adjustable or non-adjustable orifice device may be incorporated into either of passages 187, 189 for restricting fluid flow between volumes 183, 185.

It should be noted that one feature of this embodiment is that dampers 149, 151 remain at the same angle relative to yoke 127 as blade assembly 121 rotates about the pitch axis. This means dampers 149, 151 act only on the component of the motion of blade assembly 121 that is in a plane normal to mast axis 133.

To transfer forces and motion from force transfer member 171 to piston 181, beam 175 extends through an aperture 199 in housing 177 and engages one end of a peanut-shaped link 201. Link 201 comprises two spherical cavities 203, 205, and each cavity houses a spherical bearing 207, 209, respectively. Bearing 207 engages an end 211 of beam 175, and bearing 209 engages a post 213 protruding from a central, interior portion of piston 181. Each bearing 207, 209 is free to rotate within the associated cavity 203, 205, allowing beam 175 to move relative to piston 181 while remaining connected to piston 181. As centrifugal forces build due to rotation of rotor assembly 119, the freedom of movement in the linkage between beam 175 and piston 181 allows for transfer member 171 to move radially outward without causing binding in the linkage.

An outer surface 215 of housing 177 is sealed to an outer surface 217 transfer member 171 with a laminated elastomeric shear bearing 219. Bearing 219 preferably has an oval or rectangular horizontal cross-section and encloses an annular fluid volume 221 that contains additional fluid and is in fluid communication with piston 181 and volumes 183, 185 through aperture 199. The fluid in each fluid volume 221 is unpressurized during operation, so that beams 175 move through unpressurized fluid. Bearing 219 allows for transfer member 171 to move in the lead-lag directions relative to dampers 149, 151 and allow for the radial displacement due to centrifugal forces. Bearings 219 also carry beam loads transferred from blade 123 and through grip 125. Though not shown in the figures, damper 149 may include a balloon accumulator, diaphragm, or other accumulator device to facilitate thermal expansion of fluid in damper 149. It should be noted that bearing 219 may be formed from an elastomer that has a high damping coefficient, providing for additional damping force.

Each damper 149, 151 has an auxiliary fluid chamber 223, 225, respectively. Chambers 223, 225 are each located above the associated damper 149, 151 and provide for storage of additional fluid, visual inspection of the fluid level, and access for adding fluid. Fluid chamber 223 is formed in an upper portion of housing 177 of upper damper 149. Chamber 223 has a translucent sight glass 227 to allow for visual inspection of the fluid surface level 229 of the fluid of damper 149. Chamber 223 also has a filling port 231 that allows access to chamber 223 for adding fluid. Chamber 223 is in fluid communication with cylinder 179 of damper 149 through fluid passage 233, and fluid is able to move from chamber 223 into damper 149 by force of gravity. This ensures that damper 149 is always supplied with additional fluid in the event of a leak in damper 149. Likewise, fluid is able to move through passage 233 from damper 149 into chamber 223, such as may occur due to thermal expansion of the fluid.

Fluid chamber 225 is formed in an interior portion of central body 173 of member 171. Like chamber 223, chamber 225 has a translucent sight glass 235 to allow for viewing of fluid level 237 and a filling port 239 that provides access to chamber 225 for adding fluid. Chamber 225 is in fluid communication with damper 151 through fluid passage 241, and fluid is able to move from chamber 225 into damper 151 by gravity. This ensures that damper 151 is always supplied with additional fluid in the event of a leak in damper 151. Likewise, fluid is able to move through passage 241 from damper 151 into chamber 225, such as may occur due to thermal expansion of the fluid.

During operation, the inboard portion of grip 125 moves in a direction opposite to the lead or lag motion of the outboard end of blade 123. Shaft 159 causes lateral movement of transfer member 171, and beams 175 causes a corresponding motion of pistons 181 of dampers 149. 151. The movement of pistons 181 forces at least a portion of the fluid within one of volumes 183, 185 to pass through passage 187 and into the other of volumes, 183, 185. The flow restriction caused by the narrow diameter of passage 187 damps the relative motion between each piston 181 and the associated housing 177, thus damping relative motion of grip 125 and damper support arms 150, 152 and yoke arm 129.

The lead-lag damper described above provides for several advantages, including the ability to replace an existing damper in a rotor with a fluid damper by changing only the damper support plates.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description.

The invention claimed is:

1. A damper for damping chordwise lead-lag motion about a lead-lag axis of a blade of a rotor assembly, the rotor assembly comprising a yoke and blade assemblies carried by the yoke, the yoke attached to a mast for being driven in rotation by the mast, the damper comprising:
    a body adapted to be mounted to one of an inboard portion of a blade assembly and a fixed portion of the rotor assembly, the body being located inboard of a lead-lag axis, the inboard portion of the blade assembly being rotatable about the lead-lag axis relative to a yoke;
    a piston slidably engaged within the body and configured to allow for relative motion between the body and the piston, the piston being configured to form a seal between an inner surface of the body and an outer surface of the piston and configured to define opposing chambers within the body, the chambers being in fluid communication through a fluid passage extending through a thickness of the body;
    an adjustable flow-restriction device configured to adjustably restrict fluid passing through the fluid passage; and
    a link adapted to connect the piston to the other of the inboard portion of the blade assembly and the fixed portion of the rotor assembly, the link engaging a central portion of the piston;
    wherein fluid carried within the chambers is acted on by the piston during relative motion between the piston and the body, the piston causing fluid to flow between the chambers through the fluid passage; and
    wherein fluid flow through the fluid passage acts to damp relative motion between the body and the piston and damp relative lead-lag motion between the inboard portion of the blade assembly and the fixed portion of the rotor assembly.

2. The damper according to claim 1, wherein:
    the body is adapted to be mounted to the inboard portion of the blade assembly, and the link is adapted to connect the piston to the fixed portion of the rotor assembly.

3. The damper according to claim 1, wherein:
    the link is adapted to connect the piston to the inboard portion of the blade assembly, and the body is adapted to be mounted to the fixed portion of the rotor assembly.

4. The damper according to claim 1, further comprising:
    a pressure relief device for relieving excess pressure in the damper.

5. The damper according to claim 1, further comprising:
    an elastomeric shear bearing forming an additional fluid chamber in fluid communication with the chambers.

6. The damper according to claim 1, further comprising:
    an elastomeric shear bearing forming an additional fluid chamber in fluid communication with the chambers;
    wherein fluid in the additional fluid chamber is unpressurized during operation.

7. The damper according to claim 1, further comprising:
    an elastomeric shear bearing forming an additional fluid chamber in fluid communication with the chambers;
    wherein the shear bearing is formed from an elastomer having a high coefficient of damping.

8. A damper for damping chordwise lead-lag motion about a lead-lag axis of a blade of a rotor assembly, the rotor assembly comprising a yoke and blade assemblies carried by the yoke, the damper comprising:
    a body adapted to be mounted to an inboard portion of a blade assembly at a location inboard of a lead-lag axis, the body adapted for movement with the inboard portion of the blade assembly and relative to a yoke;
    a piston slidably engaged within the body and configured to allow for relative motion between the body and the piston only in a chordwise direction, the piston being configured to form a seal between an inner surface of the body and an outer surface of the piston and configured to define opposing chambers within the body, the chambers being in fluid communication through a fluid passage extending through a thickness of the body;
    an adjustable flow-restriction device configured to adjustably restrict fluid passing through the fluid passage; and
    a link adapted to connect the piston to the yoke, the link engaging a central portion of the piston and allowing for movement of the body relative to the piston;
    wherein fluid carried within the chambers is acted on by the piston during relative motion between the piston and the body, the piston causing fluid to flow between the chambers through the fluid passage; and
    wherein fluid flow through the fluid passage acts to damp relative motion between the body and the piston and damp relative lead-lag motion between the inboard portion and the yoke.

9. The damper according to claim 8, further comprising:
a pressure relief device for relieving excess pressure in the damper.

10. The damper according to claim 8, further comprising:
an elastomeric shear bearing forming an additional fluid chamber in fluid communication with the chambers.

11. The damper according to claim 8, further comprising:
an elastomeric shear bearing forming an additional fluid chamber in fluid communication with the chambers;
wherein fluid in the additional fluid chamber is unpressurized during operation.

12. The damper according to claim 8, further comprising:
an elastomeric shear bearing forming an additional fluid chamber in fluid communication with the chambers;
wherein the shear bearing is formed from an elastomer having a high coefficient of damping.

13. The damper according to claim 8, further comprising:
a slot formed in the piston and extending radially;
wherein the link engages the piston through the slot, the slot allowing for radial movement relative to the fixed portion of the blade assembly due to centrifugal forces on the blade assembly.

14. A damper for damping chordwise lead-lag motion about a lead-lag axis of a blade of a rotor assembly, the rotor assembly comprising a yoke and blade assemblies carried by the yoke, the damper comprising:
a body adapted to be mounted to a fixed portion of the rotor assembly, the body being located inboard of a lead-lag axis, the inboard portion of the blade assembly being rotatable about the lead-lag axis relative to a yoke;
a piston slidably engaged within the body and configured to allow for relative motion between the body and the piston, the piston being configured to form a seal between an inner surface of the body and an outer surface of the piston and configured to define opposing chambers within the body, the chambers being in fluid communication through a fluid passage extending through a thickness of the body;
an adjustable flow-restriction device configured to adjustably restrict fluid passing through the fluid passage; and
a link adapted to connect the piston to the inboard portion of the blade assembly, the link engaging a central portion of the piston;
wherein fluid carried within the chambers is acted on by the piston during relative motion between the piston and the body, the piston causing fluid to flow between the chambers through the fluid passage; and
wherein fluid flow through the fluid passage acts to damp relative motion between the body and the piston and damp relative lead-lag motion between the inboard portion of the blade assembly and the fixed portion of the rotor assembly.

15. The damper according to claim 14, further comprising:
a pressure relief device for relieving excess pressure in the damper.

16. The damper according to claim 14, further comprising:
an elastomeric shear bearing forming an additional fluid chamber in fluid communication with the chambers.

17. The damper according to claim 14, further comprising:
an elastomeric shear bearing forming an additional fluid chamber in fluid communication with the chambers;
wherein fluid in the additional fluid chamber is unpressurized during operation.

18. The damper according to claim 14, further comprising:
an elastomeric shear bearing forming an additional fluid chamber in fluid communication with the chambers;
wherein the shear bearing is formed from an elastomer having a high coefficient of damping.

\* \* \* \* \*

UNITED STATES PATENT AND TRADEMARK OFFICE
CERTIFICATE OF CORRECTION

PATENT NO. : 8,764,396 B2  
APPLICATION NO. : 12/866920  
DATED : July 1, 2014  
INVENTOR(S) : Frank B. Stamps et al.

Page 1 of 1

It is certified that error appears in the above-identified patent and that said Letters Patent is hereby corrected as shown below:

Title Page, item (86), of the Letters Patent lists the PCT No. as PCT/UW2008/053742.

The correct Letters Patent PCT No. is PCT/US2008/053742

Signed and Sealed this  
Thirteenth Day of January, 2015

Michelle K. Lee  
*Deputy Director of the United States Patent and Trademark Office*